United States Patent Office 3,450,265
Patented June 17, 1969

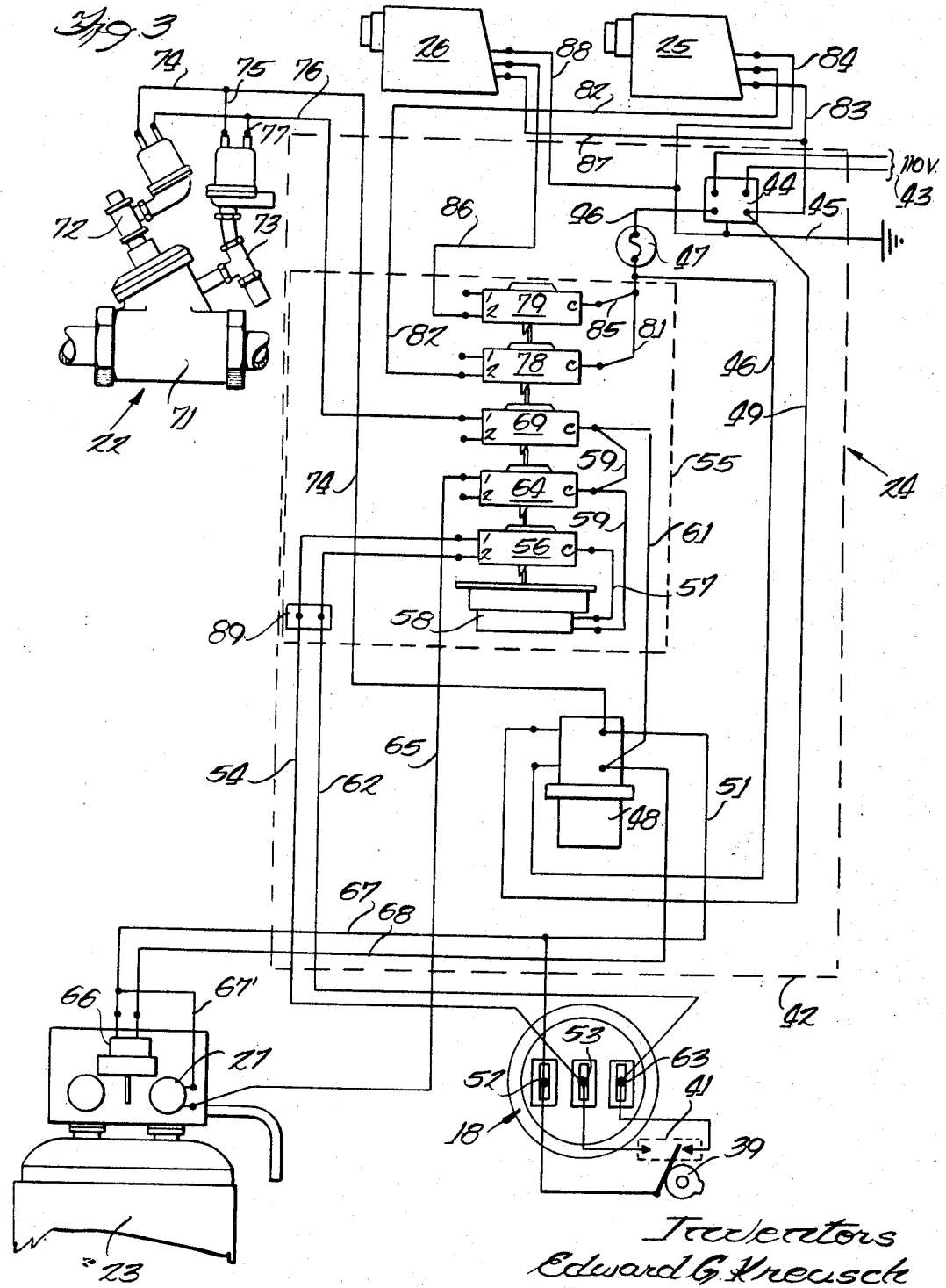

3,450,265
RECIRCULATING WATER TREATMENT AND CONTROL SYSTEM
Edward G. Kreusch, Arlington Heights, and Edwin A. Morrison, Highland Park, Ill., assignors to Culligan, Inc., Northbrook, Ill., a corporation of Delaware
Filed May 11, 1967, Ser. No. 637,731
Int. Cl. B01d 15/00
U.S. Cl. 210—140         7 Claims

ABSTRACT OF THE DISCLOSURE

A control system for a recirculating water treatment system, such as a cooling tower or steam generator, for the addition of water and chemical additives to the water in the system and for the blow-down of water from the system to prevent mineral build-up therein. The control system includes a pacing water meter providing a signal when a predetermined quantity of water has passed therethrough to initiate a timer in a control circuit controlling a series of switches for varying time intervals with each switch actuating a chemical feeder, a blow-down solenoid valve, or a brine make-up water valve for a water softener. The control circuit includes a holding circuit initiated by a switch to operate the timer for a complete cycle even though the signal from the water meter has terminated.

---

The present invention relates to a recirculating water treatment system and more particularly to a control system for the circulating water arrangement of a cooling tower, a boiler or similar device for the addition of water to the system and for the bleeding off of a portion of the water to prevent excessive mineral concentration and the addition of chemicals to the recirculating water to prevent scaling, corrosion and the like.

In a recirculating water system for a cooling tower or a boiler, a portion of the water is usually bled off in order to prevent excessive concentration of minerals in the water due to evaporation losses, and also chemicals are generally added to the water to prevent scaling, corrosion, biological growths or the formation of other undesirable substances. The water is circulated from a cooling tower to the equipment requiring cooling and then back to the tower, or pumped to a boiler where steam is generated and passes to the equipment requiring the steam, and the condensate is returned to the boiler. Control of bleed-off and the concentration of the treating chemicals in the circulating water previously has required the use of relatively expensive and complex systems, particularly when controlled within fairly narrow limits. The present invention provides a relatively inexpensive simplified system to accomplish the desired results.

Among the objects of the present invention is the provision of a novel control system for the recirculating water system for a cooling tower or boiler to automatically control the addition of chemicals to the water and for automatically bleeding-off or wasting a predetermined portion of the water to avoid an excessive concentration of the mineral present in the water. Without a control system, a water treatment program had to be established for the worst possible situation with poor control over treatment additions and bleed-off. With the control system, any treatment of the water of the recirculating system is simplified to a proportional basis, and is referenced to the quantities of replacement water added to the system.

Another object of the present invention is the provision of a water treatment and control system utilizing intermittent operation for the achievement of great economies in the system. Better control of conditions in recirculating water are readily obtained in intermittent operation, approaching a continuous operation, through a metered bleed-off or blow-down.

A further object of the present invention is the provision of a control system for a recirculating water apparatus where a pacing water meter provides for intermittent operation of the additive and bleed-off systems during continuous operation of the recirculating water apparatus. An electric circuit controller is actuated by the pacing meter and in turn controls an automatic bleed-off or blow-down valve and automatic solution feeders. Thus, as additional water is fed to the recirculating water system, a proportionate amount of water is bled off. Further, a water softener could be utilized in the feed line of fresh water to the system if it is desired to soften the make-up water.

The present invention also comprehends the provision of a recirculating water system where an electric circuit controller determines the time interval during which each of the different pieces of water treatment equipment will operate. The chemical feeders will feed into the system a quantity of chemical solution or additive proportioned to the amount of make-up water added, and a solenoid controlled automatic bleed-off valve will blow down a predetermined quantity of circulated water to retain the concentration of minerals substantially constant within the system. Furthermore, if a water softener is utilized to treat the make-up water prior to the system, the controller will also control the softener regeneration salt dosage by controlling the quantity of brine make-up water in direct proportion to the amount of resin capacity exhausted, so that only enough brine is formed to regenerate that proportion of the bed which is exhausted.

The present invention further comprehends a controller system which is adaptable to a cooling tower system, a boiler system or other suitable system utilizing a substantially closed water recirculating system therein.

Further objects are to provide a construction of maximum simplicity, efficiency, economy and ease of assembly and operation, and such further objects, advantages and capabilities as will later more fully appear and are inherently possessed thereby.

In the drawings;

FIG. 3 is a schematic circuit diagram showing the pacing meter and control arrangement for an automatic bleed-off valve, chemical feeders, and a water softener.

Figure 1:
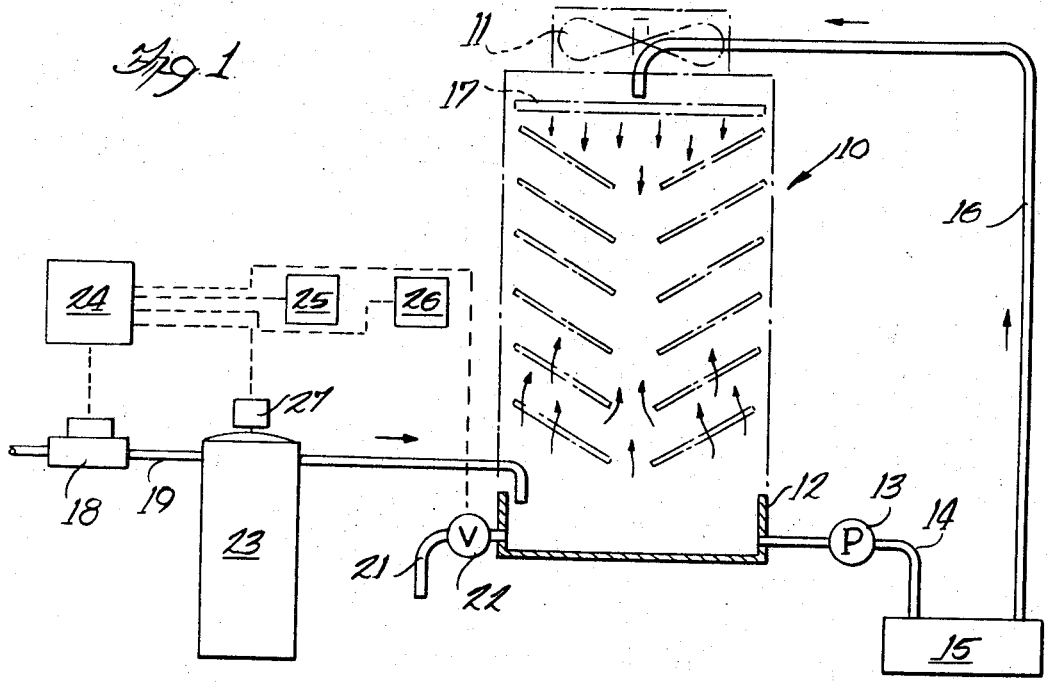
FIGURE 1 is a schematic showing of a cooling tower having a water recirculating system and the control arrangement therefor.

Referring more particularly to the disclosure in the drawings wherein are shown illustrative embodiments of the present invention, FIG. 1 discloses a controller system adapted for use with a cooling tower 10, where water to be cooled flows downwardly through the tower 10 while air is drawn upwardly through the tower by any suitable means, such as a circulating fan 11 at the top of the tower. The water flowing downwardly in the tower collects in a tower basin or reservoir 12 at the base of the tower 10. A motor driven circulating pump 13 draws the water from the basin 12 through a suction cold water line 14 to be discharged through equipment 15 or a liquid media that requires cooling, and then the water flows upwardly through a water return line 16 to a distribution means 17 at the top of the tower 10.

For the purpose of preventing scale and corrosion, as well as the formation of biological growth and any other undesirable substances, it is desirable to add certain chemicals to the water, such as acid, polyphosphates, chromates and various other water treatment chemicals. In order to accurately and systematically feed these materials into the circulating water system, a pacing meter 18, such as a commercially available Niagara water meter, is inserted into the make-up water line 19 between the source of raw water and the tower 10. Also a bleed line 21 is connected to the tower basin or reservoir 12 for bleedoff of water from the system through a bleed-off control valve 22. Also a water softener 23 may be installed in the line 19 to soften the make-up water for the cooling tower.

When the make-up water is added to the circulating water of the tower 10, the flow of any predetermined amount of water through the pacing meter 18 is translated into an electrical impulse, which is transmitted to the electric circuit controller 24. This circuit controller then actuates, for pre-established lengths of time, the chemical feeders 25 and 26, the automatic valve 22 for the bleed-off line 21 and, if a water softener 23 is utilized, the fresh water refill solenoid valve 27 for liquid refill to an assocated brine tank to dissolve salt in the tank and produce brine in a quantity proportioned to the amount of resin in the softener that is exhausted. Thus, a substantially constant quantity of water circulates through the tower 10 at all times of operation; the make-up water replacing water lost due to evaporation and the water being bled off from the basin or reservoir 12.

Figure 2:
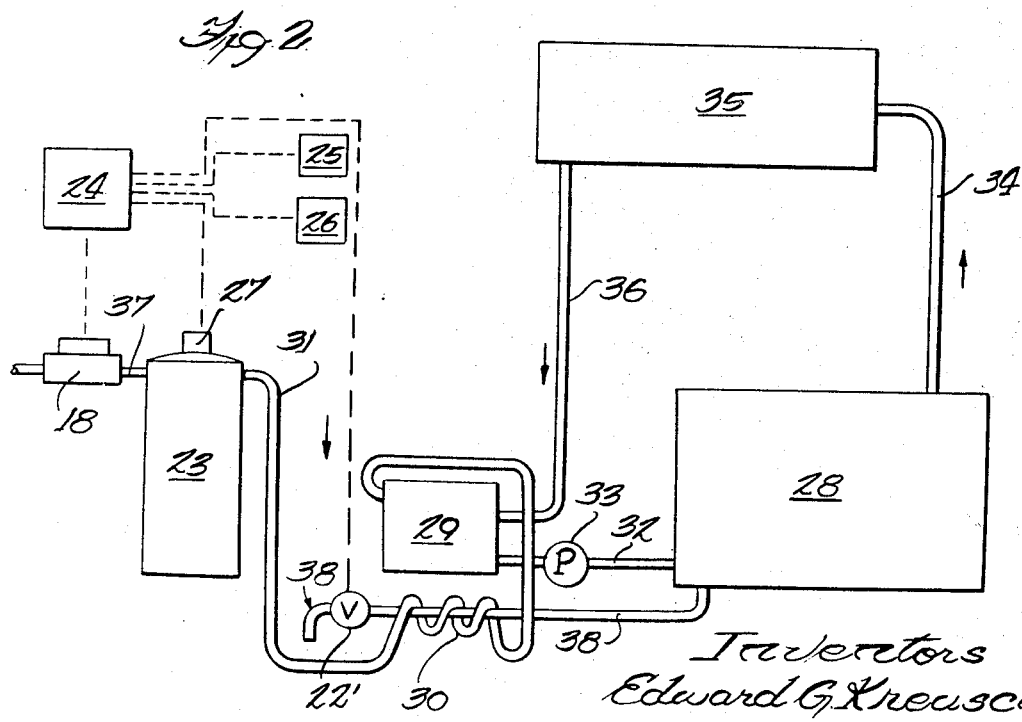
FIG. 2 is a schematic showing similar to FIG. 1 but for a boiler system.

Now referring to FIG. 2, the same general control system is adapted to a water conditioning system utilized with a boiler or steam generator 28. A feed water retention tank or reservoir 29 receives water from a supply line 31 leading from a water softener 23 treating the raw water from a source of supply; the water passing through the coils 30 of a heat exchanger inserted in the line 31. The water is drawn from the retention tank 29 through a suction line 32 by a motor driven circulating pump 33 and is discharged into the boiler 28. The water is heated to steam and the generated steam is piped through line 34 to the equipment 35 requiring the use of steam. Some of the steam is condensed and returned to the retention tank or reservoir 29 by means of a condensate return line 36.

Here again, for the prevention of scale and corrosion in the system as well as the formation of other undesirable substances, it is also desirable to add certain chemicals to the water, such as orthophosphates, sulfites, amines and various other water treatment chemicals. To accomplish this object, the pacing meter 18 is installed in the boiler make-up water line 37 between the raw water source and the water softener 23. As described with respect to FIG. 1, the pacing meter 18 will relay an electrical impulse to the electric circuit controller 24 for a pre-determined quantity of water flowing through it, and the circuit controller 24 actuates the chemical feeders 25 and 26, the water softener brine make-up water valve 27 and the solenoid controlled heat exchanger blow-down control valve 22' in the blow-down line 38. The line 38 leads from the boiler 28 through the center of the coils 30 of the heat exchanger to cool the water prior to exiting through the blow-down valve 22'; and the make-up water in line 31 is preheated. Therefore, the metered blow-down and chemical addition are limited as to chemical treatment and mineral content in direct proportion to the water used as make-up for the boiler system.

FIG. 3 discloses a schematic drawing of the circuit utilized for the electric circuit controller 24 for controlling the bleed-off control valve 22 or blow-down control valve 22', the chemical feeders 25 and 26, and the brine make-up or refill water valve 27. The pacing water meter 18 rotates a cam 39 which in turn actuates a single-pole double-throw switch 41. The cam is arranged on a pre-determined basis to provide an electrical impulse at the completion of the passage of a specific number of gallons through the meter 18. Through electrical leads the switch 41 is connected to the controller 42. A power supply 43 of 110 volts is supplied to the controller 42 to an off-on double-pole, single-throw switch 44. The switch 44 is grounded through a suitable earthing or ground in lead 45.

From the switch 44, the hot lead 46 is fed through a 5-amp fuse 47 and then to a 12-volt output transformer 48. The neutral lead 49 also leads from the switch to the transformer 48 to complete the current supply. From the transformer 48, power is fed through line 51 to the common terminal 52 of the switch 41 on the pacing meter 18. When the cam 39 causes the switch 41 to change position, power from line 51 is contacted to the open terminal 53 of the switch and travels back through lead 54 to terminal 1 on a snap-switch 56 of a 12-volt timer 55. The timer 55, as illustrated, consists of five snap-switches with adjustable cams driven by a 12-volt 1 r.p.m. motor. It will become readily apparent that more or fewer such snap-switches can be provided to control more or fewer devices through separate electric circuits. The power passes through the switch 55 and through line 57 to the motor 58 and from motor 58 through lines 59 and 61 back to the neutral contact of the transformer 48, thus completing the circuit to run the motor 58.

Due to a safety feature, the motor 58 will turn all of the cams until snap-switch 56 changes position; at which point the motor 58 can receive no power from switch 56 as the switch blade from the common terminal is now contacting to the terminal 2 connected to the lead 62, which in turn is connected to the presently open terminal 63 of the water meter switch 41. This feature has placed the timer 56 in a ready position but does not allow it to run until the water meter 18 has sensed sufficient flow to cause the cam 39 to reverse the switch 41. Thus, if flow should stop when the meter was in contacted position, the timer motor 58 would not run uncontrolled continuously.

If sufficient flow through the pacing meter 18 has caused the switch 41 to return to its closed position contacting terminal 63, then power from terminal 52 will travel back through lead 62 to terminal 2 of switch 56 and to the motor 58. This will again complete the circuit, allowing the motor 58 to run until such time as the cam for switch 56 reverses the position of the switch returning the switch blade to terminal 1, opening the circuit and stopping the motor 58. Sizing of the pacing water meter is important to assure that the 1 r.p.m. motor 58 will have time to complete its cycle and shut off before the switch 41 in the meter 18 reverses and again makes contact, starting the cycle in operation once more.

As noted above, the timer motor 58 drives five cams which control five switches, the switch 56 and its function having been described. In the off position of switch 56 with the motor 58 not running, none of the other four switches are supplying current to their respective accessories. The cams for these switches supply power to their accessories only after the timer has commenced operation after its null period. The null period is that period of time when the timer motor 58 is off due to the switch 41 in the pacing meter 18 still being in an open position relative to the switch 56.

One of the features of this electric control system is that the switch 64 actuated by the timer motor 58, through a pre-determined cam setting relating to time and flow rate, through a lead 65 from the 1 terminal of switch 64 to the refill solenoid valve 27 of the water softener control valve 66 will allow water to flow to the softener brine tank (not shown). Thus, through the setting of switch 64, water can be supplied to the brine tank to generate only the quantity of brine necessary to regenerate the resin exhausted by the total amount of water passing through the softener 23 as measured by the pacing meter 18. For safety reasons, a 12-volt water softener control valve such as described in the copending Edwin A. Morrison application Ser. No. 352,533, now abandoned, has been utilized. A separate lead 67 from the power lead 51 goes to the control valve 66 of the softener with a branch line 67' from the lead 67 to the other terminal of the valve 27, and a lead 68 returns from valve 66 to the transformer 48; the valve 66 controlling the regeneration cycle of the softener.

The proportional control of the bleed-off from the cooling tower 10 or blow-down from boiler 28 is accomplished through a switch 69 of the timer assembly 55. The accessory referred to as the bleed-off device 22 or blow-down device 22' shown in FIG. 3 is preferably a diaphragm-type valve 71 operated by water pressure as controlled by a pilot valve 72 which is controlled by the snap switch 69. An operational solenoid pilot valve 73 has been shown as part of the device 22 or 22' whose function is to supply line pressure under the diaphragm of the bleed-off valve 71 should the valve be installed in such a position that there is not sufficient water from the bleed-off line 21 or 38 from either the cooling tower or boiler, respectively, to properly close valve 71; this being a possibility in some installations.

These solenoid operated pilot valves 72 and 73 are actuated by a line 74 from the hot side of the transformer 48 and having branch line 75 to valve 73. The line 76 from valve 72, with branch line 77 from valve 73, is connected to terminal 1 of switch 69; the common terminal of this switch being connected to line 61 returning to the transformer 48.

The switches 78 and 79 control actuation of the chemical feeding pumps 25 and 26, respectively. A hot lead 81 from the fuse 47 connects to the common terminal of switch 78, and lead 82 connects terminal 2 of this switch with the feeder 25. Line 83 from the feeder 25 goes back to the neutral side of the switch 44 and line 84 connects to the ground line 45. Similarly, lead 85 connects the common terminal of switch 79 with the fuse 47, and lead 86 proceeds from terminal 2 of this switch to feeder 26. Lead 87 goes from the feeder to intersect line 83 and lead 88 intersects line 84 to ground.

A momentary contact switch 89 has been provided in the controller assembly 24 to facilitate checking of the controller. The switch 89 being wired in parallel with snap-switch 56 operates to duplicate the switch action normally obtained from the switch 41 within the pacing water meter 18 and is provided for service and checking purposes only.

While the improvement has been shown and described as being advantageously applicable to a cooling tower or steam boiler, it is not our desire or intent to unnecessarily limit the scope or the utility of the improved features by virtue of these illustrative embodiments.

Having thus disclosed the invention, we claim:

1. A control system for a recirculating water system having a reservoir, a source of raw water communicating with the reservoir, a pacing meter between the source of raw water and the reservoir, at least one chemical feeder communicating with said reservoir, a bleed-off conduit from the reservoir and a control valve in the bleed-off conduit, the control system comprising a rotary cam actuated by the flow of water through the pacing water meter, a single-pole double-throw switch actuated by said cam and having a common terminal and a pair of contact terminals, and a control circuit actuated by said switch upon the passage of a predetermined quantity of water through said meter, said circuit including a timer having a timer motor, a plurality of switches, a corresponding number of cams rotated by said timer motor and actuating said switches, a first switch being a single-pole double-throw switch having a common terminal connected in series with said timer motor and a power source and a pair of terminals, each of said last mentioned terminals connected to one of said terminals of the switch in the water meter, said common terminal in said switch in the water meter connected in series with said power source, said first switch controlling actuation of the timer motor and the remaining switches independently controlling actuation of the chemical feeder and the bleed-off control valve for the desired time intervals.

2. A control system as set forth in claim 1, in which said remaining switches are single-pole single-throw switches having one side of each switch connected to the power source and the other side connected to the device being actuated.

3. A control system as set forth in claim 1, in which the cycle of said timer is completed before a second signal is received from said pacing water meter.

4. A control system as set forth in claim 1, including a water softener positioned between the water meter and the reservoir and including a brine tank for regeneration of the softener, a refill solenoid valve on the softener controlling flow of makeup water to the brine tank, and a switch and cam in said timer controlling actuation of the refill solenoid valve.

5. A control system as set forth in claim 4, including a control valve on said softener connected to said power source for controlling the liquid flow through the softener.

6. A control system as set forth in claim 4, in which said cams and switches actuate the chemical timer for a time interval which may be different from the time interval for actuation of the bleed-off control valve, which in turn may be different from the time interval for actuation of the refill solenoid valve.

7. A control system as set forth in claim 6, including a second chemical feeder and a cam and switch in said timer actuating said second chemical feeder for a time interval which may be different from the intervals of said first chemical feeder, said bleed-off control valve, and said refill solenoid valve.

References Cited
UNITED STATES PATENTS

| | | | |
|---|---|---|---|
| 1,971,338 | 8/1934 | Contant | 210—140 X |
| 2,054,798 | 9/1936 | Gibson | 210—60 |
| 2,359,991 | 10/1944 | Hinsch | 210—89 X |
| 2,433,167 | 12/1947 | Smith | 210—167 X |
| 2,502,349 | 3/1950 | Sebald | 210—134 X |
| 3,258,422 | 6/1966 | Ferry | 210—60 X |

REUBEN FRIEDMAN, *Primary Examiner.*

FRANK A. SPEAR, JR., *Assistant Examiner.*

U.S. Cl. X.R.

210—142, 199, 257, 259